(12) United States Patent
Coyle et al.

(10) Patent No.: US 6,314,114 B1
(45) Date of Patent: Nov. 6, 2001

(54) DISTRIBUTED RESOURCE MANAGEMENT

(75) Inventors: Mark Coyle, Mountain View; Gianfranco Putzolu, San Francisco, both of CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/103,629

(22) Filed: Jun. 23, 1998

(51) Int. Cl.[7] .................................................. H04J 3/06
(52) U.S. Cl. ............................. 370/503; 707/8; 707/10
(58) Field of Search .................................. 370/431, 449, 370/450, 464, 465, 498, 503, 507, 254; 707/8, 204, 205, 206, 9, 10, 202, 201; 710/200, 107

(56) References Cited

U.S. PATENT DOCUMENTS

| | | | |
|---|---|---|---|
| 5,920,872 | * | 7/1999 | Grewell ................................ 707/202 |
| 6,041,384 | * | 3/2000 | Waddington ......................... 710/200 |
| 6,108,654 | * | 8/2000 | Chan ......................................... 707/8 |

* cited by examiner

*Primary Examiner*—Douglas Olms
*Assistant Examiner*—Ricardo M. Pizarro
(74) *Attorney, Agent, or Firm*—Hickman Palermo Truong & Becker LLP; Edward A. Becker

(57) ABSTRACT

An approach for managing resources in a distributed computing system includes establishing dedicated process pools on nodes where work is to be performed. Each dedicated process pool is associated with a particular remote node and includes one or more processes. The one or more processes in each dedicated process pool perform work on behalf of processes on the associated remote node. Each dedicated process pool is managed by processes on the associated remote node using local synchronization data maintained on the associated remote node. The assignment of particular processes to perform work on behalf of processes on the associated remote node is performed by the processes on the associated remote node. In addition, the spawning of additional processes or the termination of existing processes from a dedicated process pool is managed by the processes on the associated remote node.

32 Claims, 8 Drawing Sheets

| CLIENT PROCESS | CORRESPONDING DEDICATED SERVER PROCESS | | |
|---|---|---|---|
| | NODE 1 | NODE 1 | NODE 1 |
| C1 | NA | N2-S1 | N3-S1 |
| C2 | N1-S1 | N2-S2 | N3-S2 |
| C3 | N1-S2 | N2-S3 | N3-S3 |
| C4 | N1-S3 | NA | N3-S4 |
| C5 | N1-S4 | N2-S4 | N3-S5 |
| C6 | N1-S5 | N2-S5 | N3-S6 |
| C7 | N1-S6 | N2-S6 | NA |

FIG. 1B

DISTRIBUTED RESOURCE MANAGEMENT

FIELD OF THE INVENTION

The present invention relates to distributed computing, and more specifically, to managing resources in a distributed computing environment.

BACKGROUND OF THE INVENTION

In a distributed computing environment, work can be performed on multiple computing entities, often referred to as "nodes." One example of a node is a computer system on which one or more processes or threads may execute. Nodes in a distributed computing environment are typically communicatively coupled, for example via a network, to allow processes on any given node to access resources on other nodes. In a hardware context, a resource is generally a device such as a printer, disk drive or memory. In a software context, a resource is generally a set or item of data or a routine.

An important concern in a distributed computing environment is how to manage access to resources by remote processes to ensure that work is completed in an orderly and efficient manner. In a typical scenario, a first process executing on a first node, requires access to a resource, for example a database, on a second node, sometimes referred to as a "remote node." The first process sends a request to the second node for particular work to be performed using the resource on the second node. A process on the second node is assigned to the first process to perform the requested work on behalf of the first process. When the work is completed, the results are made available to the first process. In practice, this scenario can become significantly more complicated as the first process requires access to multiple resources on multiple nodes or other processes also require access to the same resources. As a result, numerous approaches for managing resources in distributed computing systems have been developed. Three known approaches include: (1) dedicated process; (2) remote process management and (3) global synchronization, which are each described hereinafter.

Dedicated Process

The dedicated process approach involves establishing processes on nodes where work is to be performed on behalf of remote processes (processes on other nodes), where the processes thus established are dedicated to work exclusively for specific remote processes. When a particular process requires work to be performed on a remote node, the process on the remote node that is assigned to the particular process performs the work on behalf of the particular process. Thus, any work that is performed on behalf of a remote process is performed by a specific dedicated process. A remote process uses only its own dedicated process and does not share its dedicated process with other remote processes.

FIG. 1A is a block diagram illustrates a distributed system 100 that uses the dedicated process approach to perform work on remote nodes. Distributed system 100 includes three nodes, NODE1, NODE2 and NODE3 that are communicatively coupled so that they can exchange data and information with each other. NODE1, NODE2 and NODE3 each include three client processes or threads identified as C1–C3, C4–C6 and C7–C9, respectively.

Client processes C1–C3 each require work to be performed on NODE2. According to the dedicated process approach, dedicated server processes N2–S1, N2–S2 and N2–S3 are established on NODE2 to exclusively perform work on NODE2 on behalf of client processes C1–C3 respectively.

When client process C1 requires work to be performed on NODE2, server process N2–S1 performs the required work on NODE2 on behalf of client process C1. Similarly, when client process C2 requires work to be performed on NODE2, server process N2–S2 performs the required work on NODE2 on behalf of client process C2. For example, suppose client process C2 requires particular data to be retrieved from a database (not illustrated) on NODE2. Client process C2 transmits a data retrieval request to server process N2–S2 which retrieves the particular data from the database on NODE2 and makes the data available to client process C2.

Client processes C1–C3 also each require work to be performed on NODE3. Therefore, according to the dedicated process approach, dedicated server processes N3–S1, N3–S2 and N3–S3 are established on NODE3 to exclusively perform work on NODE3 on behalf of client processes C1–C3. In addition, dedicated server processes are established on NODE1 and NODE3 to perform work on NODE1 and NODE3 on behalf of client processes C4–C6. Finally, dedicated server processes are established on NODE1 and NODE2, respectively, to perform work on NODE1 and NODE2 on behalf of client processes C7–C9.

FIG. 1B is a table that illustrates the corresponding dedicated remote server processes for each client process illustrated in FIG. 1A. Note that there are no dedicated server processes for work that is required to be performed on the same node where the client process resides, since that work is performed locally.

The dedicated process approach provides relatively good processing performance since for each client process, a corresponding server process has already been allocated and is executing. Thus, the dedicated process approach provides relatively faster response than a system that dynamically spawns server processes as requests to perform work are received, since the processing of work is not delayed while a new server process is spawned. This is particularly important when relatively small units of work are being requested by the remote processes since delays in spawning a new server process have a greater adverse effect on small units of work relative to larger units of work. For example, suppose 0.5 seconds are required for a particular remote node to spawn a new server process. The relative effect of this delay on a particular unit of work that requires 1.0 second to perform is significantly greater than on another unit of work that requires 100 seconds to perform.

However, the dedicated process approach does have some disadvantages. Most notably, the dedicated server processes are typically maintained until the associated client processes are terminated. As the number of client processes and remote nodes increase, the number of dedicated server processes that must be maintained increases dramatically, which can require a significant amount of system resources to maintain. For example, as illustrated in FIG. 1A, for three client processes on three nodes, eighteen (18) dedicated server processes must be maintained, assuming each client process must perform work on the other two nodes. For a system with four nodes and four client processes on each node, forty-eight (48) dedicated server processes are required. For a system with five nodes and five client processes on each node, one hundred (100) dedicated server processes are required. Also a number of client processes may be in an idle state not dong work for long periods of time. In this case a large number of server processes are correspondingly idle for a long time. Consequently, the dedicated process approach is ideally suited for systems having a relatively few number of client processes and remote nodes.

Remote Process Management

The remote process management approach involves establishing a "process pool" on each node where work is to be performed on behalf of remote processes. A "process pool" is a set of one or more processes that perform work on behalf of any remote process that needs work performed on the node with which the process pool is associated. A process pool manager is established to manage each process pool. Each process pool manager assigns processes in the process pool to remote processes, spawns additional processes when additional processing capability is required and terminates processes when less processing capability is required.

FIG. 2 is a block diagram that illustrates a distributed system 200 that uses the remote process management approach to perform work on remote nodes. Distributed system 200 includes three nodes, NODE1, NODE2 and NODE3 that are communicatively coupled so that they can exchange data and information with each other. NODE1, NODE2 and NODE3 each include three client processes or threads identified C1–C3, C4–C6 and C7–C9, respectively.

According to the remote process management approach, a process pool 202 is established on NODE1 that contains processes S1 and S2. A local process pool manager 204 is established to manage process pool 202. When client processes C1–C3 and C7–C9 require work to be performed on NODE1, local process pool manager 204 assigns a process S1 or S2 from process pool 202 to perform the required work. Once the required work has been completed, the assigned process, S1 or S2 may be assigned to perform additional work for the same remote client process, assigned to perform work for a different remote client process, or remain unassigned in process pool 202.

Unlike the dedicated process approach previously described, processes S1 and S2 in process pool 202 are not dedicated exclusively to a particular remote client process. Instead, processes S1 and S2 in process pool 202 are assigned by local process pool manager 204 to perform work for remote client processes based upon the work that must be performed.

Local process pool manager 204 is responsible for spawning additional processes for process pool 202 if additional processing resources are required. In addition, local process pool manager 204 is responsible for terminating one or more processes from process pool 202 if fewer processing resources are required. NODE2 includes a process pool 206 and a local process pool manager 208 for performing work on NODE2 on behalf of client processes C1–C3 and C7–C9. Similarly, NODE3 includes a process pool 210 and a local process pool manager 212 for performing work on NODE3 on behalf of client processes C1–C3 and C4–C6.

The primary benefit of the remote process management approach is that the amount of processing resources may be dynamically tailored to satisfy changing process requirements. As additional processing resources are required, process pool managers 204, 208 and 212 can spawn additional server processes. Alternatively, as fewer processing resources are required, process pool managers 204, 208 and 212 can reduce the number of active server processes. Since the number of active server processes can be dynamically adjusted based upon current processing requirements and server processes are not dedicated to specific remote client processes, the number of idle server processes can be significantly reduced, saving system resources. Moreover, since in some circumstances, for example when very little work is being performed on a particular node, the number of active processes can be reduced, additional system resources are saved.

Although the remote process management approach allows the number of active server processes to be tailored to the current work load, the approach does have some drawbacks. In particular, when a remote process requests that work be performed on a particular node, a server process must be assigned to the remote process and the execution context associated with the remote process loaded. An execution context consists of variables and other data associated with a process. Loading an execution context requires system resources and time. In some cases, there may not be any available server processes, in which case, the remote process must wait until a server process becomes available and can be assigned to the remote process. This management overhead cost can be significant when the time to perform the work is small relative to the time delays associated with assigning a server process. In many circumstances the remote process management approach uses relatively fewer resources than the dedicated process approach but provides the resource savings at the cost of a slower response time. Thus, compared to the dedicated process approach, the remote process management approach is relatively better suited for processing larger units of work.

Global Synchronization

The global synchronization approach is similar to the remote process management approach in that process pools are maintained on nodes for performing work on behalf of remote processes. However, instead of providing a process pool manager on each node to manage the process pools, the process pools are globally managed through global synchronization.

Global synchronization involves assigning available server processes to remote client processes in a manner that avoids, or at least reduces, conflicts between remote client processes for a particular server process. For example, referring to FIG. 2, suppose server process S6 has been assigned to perform work on behalf of client process C1. If client process C5 also requires work to be performed on NODE3, global synchronization ensures that server process S6 is not also assigned to client process C5. In the event that client processes C1 and C5 simultaneously request work to be performed on NODE3 and the only available server process is S6, global synchronization typically includes a prioritization scheme for determining whether server process S6 is assigned to client process C1 or C5. Global synchronization also includes managing the number of available local processes to accommodate current processing requirements. For example, as additional processing resources are required, global synchronization spawns additional server processes to handle the increased demand. Similarly, as fewer processing resources are required, global synchronization may reduce the number of active processes. Global synchronization is often implemented by a global synchronization process that either resides on one of the nodes that contains the server processes, or on another node.

Global synchronization may be implemented as a global lock. According to the global lock implementation, a client process requests a lock on a server process and if the requested server process is available, a lock on the server process is granted to the requesting client process. The client process then uses the server process and when finished, releases the lock on the server process. For example, client process C1 wants to use server process S6 and requests a lock on server process S6. If a lock on server process S6 is granted to client process C1, then client process C1 can use server process S6. Once client process C1 is finished with server process S6, then client process C1 releases the lock on server process S6, allowing another client process, for example C2, to obtain a lock on server process S6.

One of the advantages provided by the global synchronization approach is that local process pool managers are not required on each node that has a process pool. This tends to reduce the amount of local system resources required to manage the process pools. In some circumstances, this approach can reduce the amount of time required to assign a local process to perform work on behalf of a remote process. Nevertheless, the assignment of server processes to perform work on behalf of remote client processes still must be coordinated so that there are no conflicts between remote processes attempting to have work performed by the same server process.

For example, referring to FIG. 2, process pool managers 204, 208 and 212 would be eliminated. Access to local server processes S1–S12 by client processes C1–C9 is managed through global synchronization to minimize conflicts between client processes C1–C9. However, this requires client process arbitration by a global synchronization process and client processes C1–C9. Therefore, although in some circumstances the global synchronization approach provides performance benefits over the remote process management approach, the management of resources can consume a significant amount of system resources and time.

Based on the need to manage resources in distributed computing environments and the limitations in the prior approaches, an approach for managing resources in a distributed computing environment that avoids the limitations in the approaches previously described is highly desirable.

SUMMARY OF THE INVENTION

According to one aspect of the invention, a method for processing data on a distributed system that includes a first node, a second node and a third node, comprises the steps of establishing, on the third node, a first dedicated process pool containing one or more server processes, using the one or more server processes contained in the first dedicated process pool to perform work for only client processes executing on the first node, establishing, on the third node, a second dedicated process pool containing one or more server processes, using the one or more server processes contained in the second dedicated process pool to perform work for only client processes executing on the second node, in response to requests to perform work from client processes on the first node, assigning one or more server processes from the first dedicated process pool to perform the work and in response to requests to perform work from client processes on the second node, assigning one or more server processes from the second dedicated process pool to perform the work.

According to another aspect of the invention, a distributed computing system for processing data comprises a first node with a first plurality of client processes executing thereon, a second node with a second plurality of client processes executing thereon and a third node including a first dedicated process pool containing one or more server processes configured to perform work for only the first plurality of client processes, and a second dedicated process pool containing one or more server processes configured to perform work for only the second plurality of client processes.

BRIEF DESCRIPTION OF THE DRAWINGS

Embodiments of the invention are illustrated by way of example, and not by way of limitation, in the FIGURES of the accompanying drawings and in which like reference numerals refer to similar elements and in which:

FIG. 1B is a table illustrating an assignment of the remote server processes to the local client processes illustrated in FIG. 1A;

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

In general, the approach for managing resources in a distributed computing environment, according to an embodiment of the invention, involves establishing separate dedicated pools of server processes and resources on a particular node for each remote node that requires work to be performed on the particular node. Each dedicated pool of server processes and resources is associated with one remote node and performs work required by processes on the associated remote node. Each dedicated pool of resources on the particular node is managed by the processes on the associated remote node.

Dedicated Process Pools

Figure 1A:
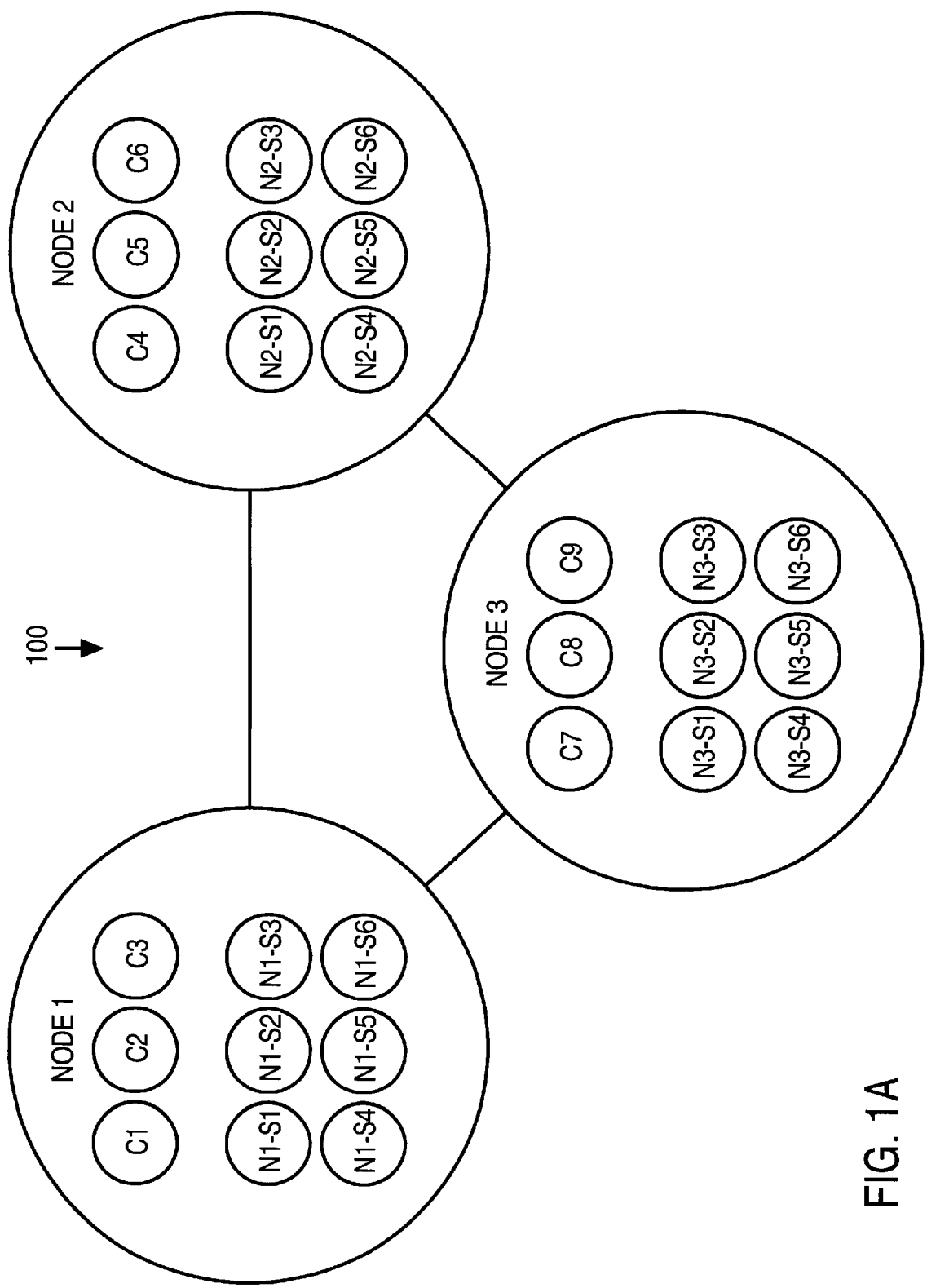
FIG. 1A is a block diagram illustrating a conventional distributed system that uses a dedicated process approach to perform work on remote nodes.
Figure 2:
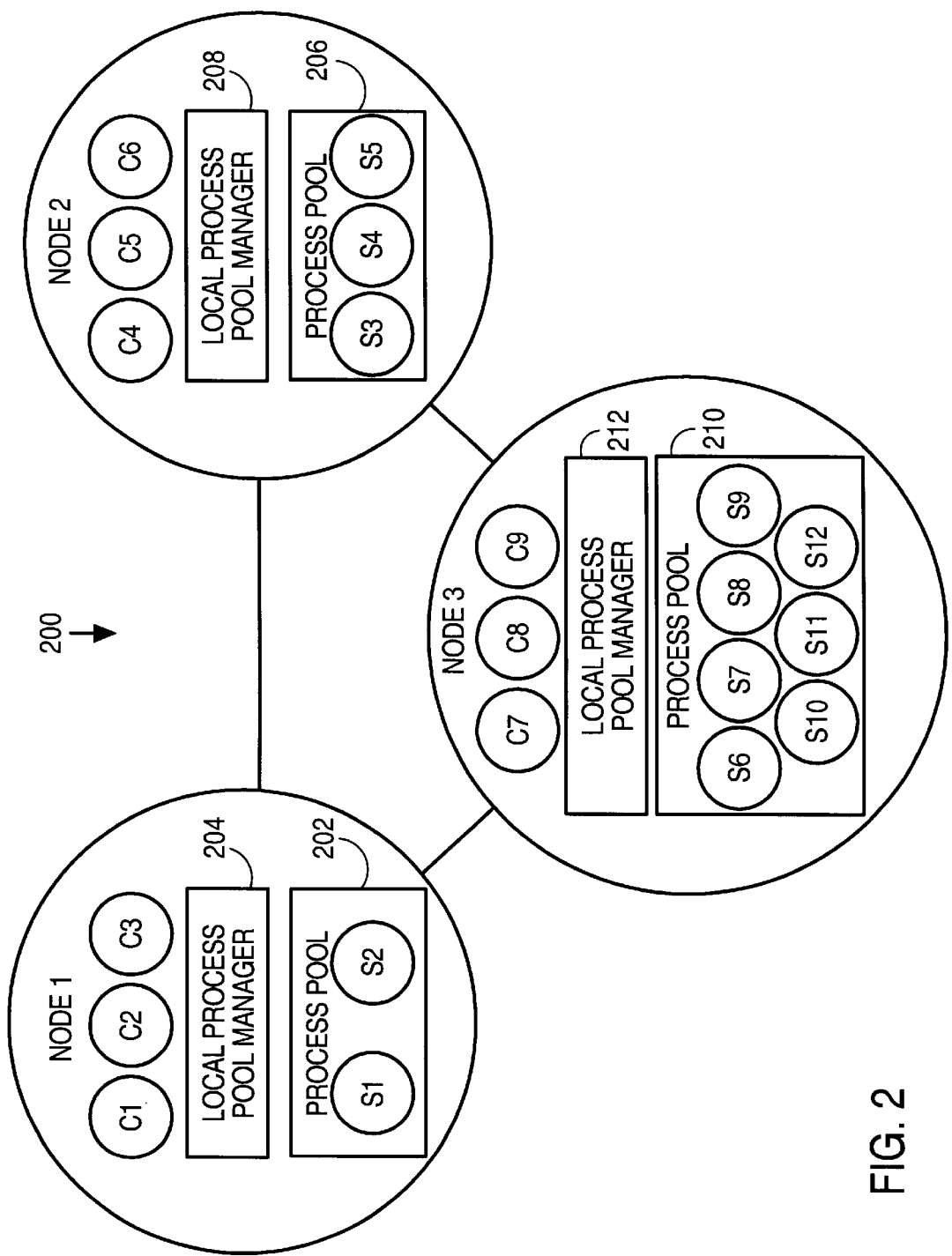
FIG. 2 is a block diagram illustrating a conventional distributed system that uses remote process management to perform work on remote nodes.
Figure 3:
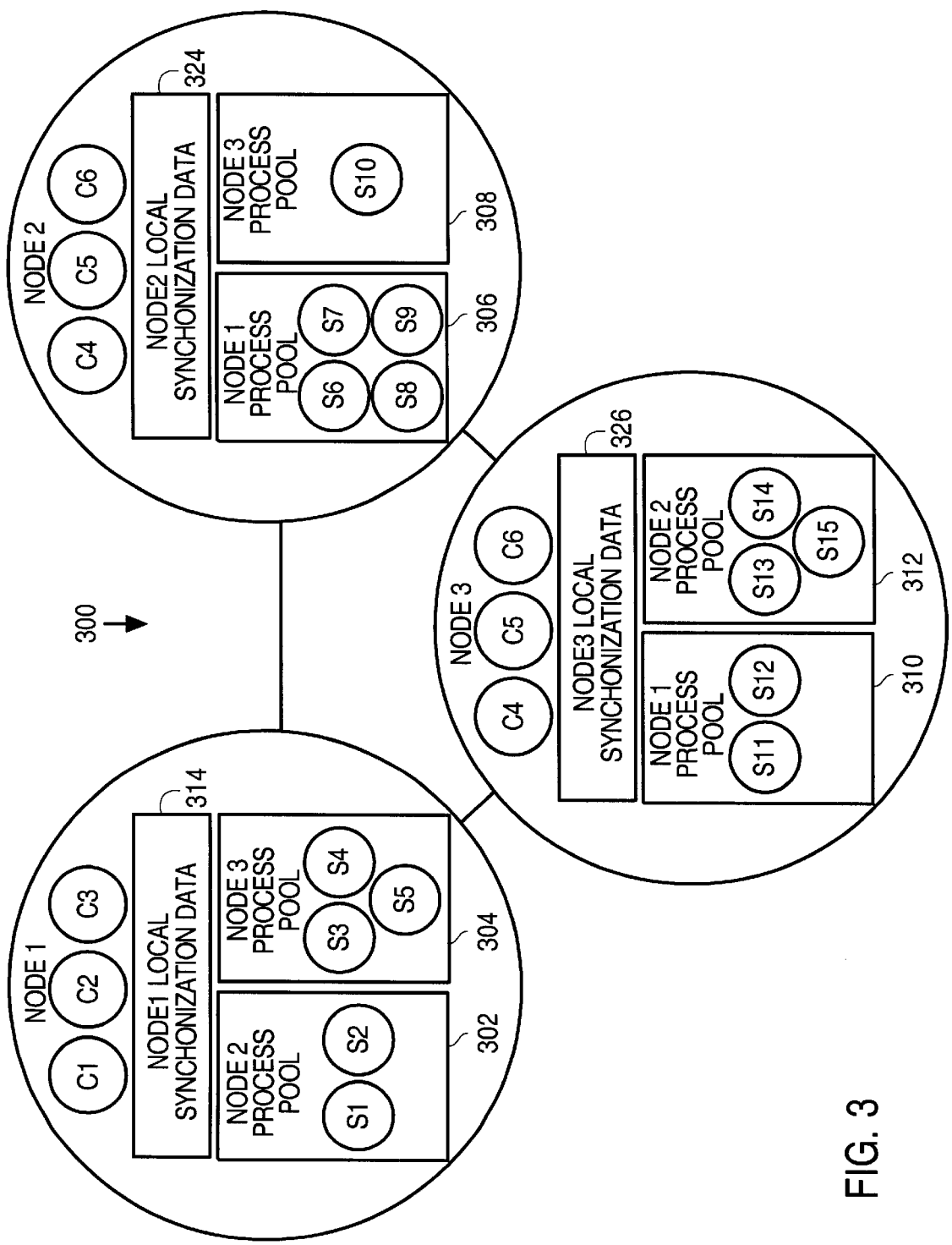
FIG. 3 is a block diagram illustrating a distributed system for managing resources according to an embodiment of the invention.

FIG. 3 is a block diagram that illustrates a distributed system 300 for managing resources according to an embodiment of the invention. Distributed system 300 includes three nodes, NODE1, NODE2 and NODE3 that are communicatively coupled so that they can exchange data and information with each other. NODE1, NODE2 and NODE3 each include three client processes or threads identified as C1–C3, C4–C6 and C7–C9, respectively.

Client processes C4–C6 require work to be performed on NODE 1. According to an embodiment of the invention, a dedicated process pool, identified as NODE2 process pool 302 is established on NODE1 for performing work on behalf of processes C4–C6. NODE2 process pool 302 contains two server processes S1 and S2. When client processes C4–C6 require work to be performed on NODE1, a server process from NODE2 process pool 302, in this example S1 or S2, is assigned to perform the work. When the work is completed, the assigned server process is released so that it can be assigned to client processes C4–C6 to perform other work.

As described in more detail hereinafter, the number of server processes contained in NODE2 process pool 302 may vary depending upon the processing requirements at any given time. Also, the management of dedicated process pools established in accordance with an embodiment of the invention is described in more detail hereinafter.

Client processes C7–C9 also require work to be performed on NODE1. According to an embodiment of the invention, a dedicated process pool, identified as NODE3 process pool 304 is established to perform work on behalf of client processes C7–C9. NODE3 process pool 304 includes server processes S3, S4 and S5 that perform work exclusively for client processes C7–C9. When client processes C7–C9 require work to be performed on NODE1, a server process from NODE2 process pool 302, in this example S3, S4 or S5, is assigned to perform the work.

Client processes C1–C3 require work to be performed on NODE2. Accordingly, NODE2 includes a NODE1 process pool 306 that includes server processes S6–S9 that perform work exclusively for client processes C1–C3 on NODE2. In addition, client processes C7–C9 require work to be performed on NODE2. Accordingly, NODE2 also includes a NODE3 process pool 308 that includes a server process S10 that performs work on NODE2 exclusively for client processes C7–C9. Similarly, NODE3 includes a NODE1 process pool 310 and a NODE2 process pool 312 for performing work exclusively for client processes C1–C3 and C4–C6, respectively. NODE1 process pool 310 includes server processes S11 and S12 that perform work exclusively for client processes C1–C3. NODE2 process pool 312 includes server processes S13–S15 that perform work exclusively for client processes C4–C6.

Managing Dedicated Process Pools

According to an embodiment of the invention, each dedicated process pool is managed by its client node. Client processes on the client node locally synchronize the assignment of server processes that belong to the process pool. In addition, client processes on the client node manage the number of active processes in the associated dedicated process pool based upon the processing needs of the client processes. These functions are described in more detail hereinafter.

Referring to FIG. 3, client processes C1–C3 manage both NODE1 process pool 306 and NODE1 process pool 310. When client processes C1–C3 require processing to be performed on NODE2 or NODE3, client processes C1–C3 on NODE1 locally synchronize the assignment of one or more processes from NODE1 process pool 306 (S6–S9) and NODE1 process pool 310 (S11 and S12), respectively.

According to one embodiment of the invention, a client node maintains, for each remote dedicated process pool on another node, local synchronization data used for synchronizing the assignment of processes that belong to that dedicated process pool. Specifically, local synchronization data identifies specific processes that are active in its corresponding dedicated process pools and the status of those processes, such as whether the processes are assigned to a particular client process or are available to be assigned to a client process on the corresponding client node.

Figure 4:
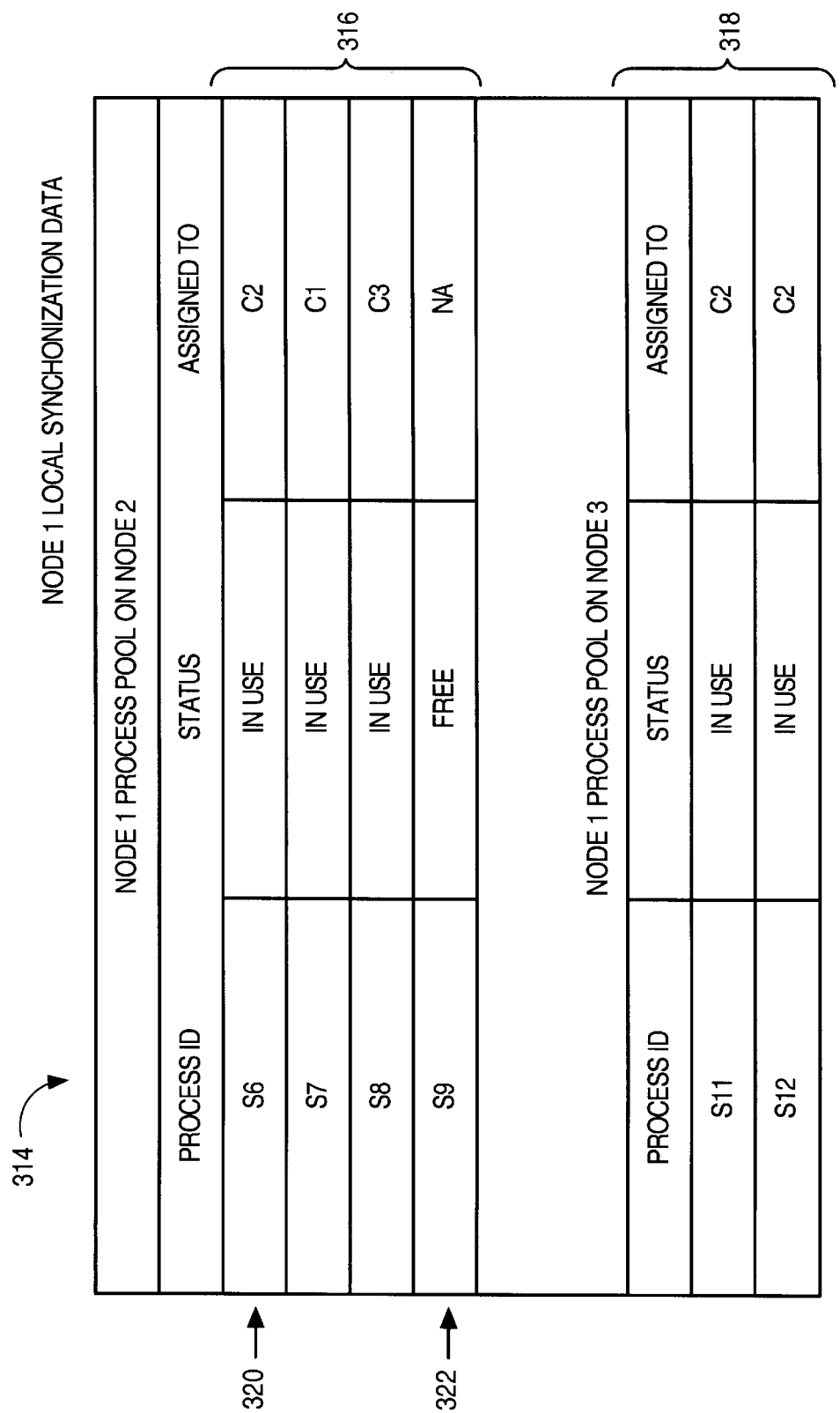
FIG. 4 is a table illustrating the contents of local synchronization data according to an embodiment of the invention.

NODE1 local synchronization data 314 is maintained on NODE1 and contains information about processes on NODE2 and NODE3 that are explicitly established to perform work on NODE2 and NODE3 for client processes C1–C3. More specifically, NODE1 local synchronization data 314 specifies the active processes and their status in NODE1 process pools 306 and 310, respectively. FIG. 4 is a table illustrating the contents of local synchronization data 314 according to an embodiment of the invention.

Local synchronization data 314 includes entries 316 that contain information about the server processes (S6–S9) in NODE1 process pool 306. Local synchronization data 314 also includes entries 318 that contain information about the server processes (S11 and S12) in NODE1 process pool 310. Each entry in entries 316 and 318 corresponds to a particular server process and specifies a PROCESS ID, a process STATUS, i.e. "IN USE" or "FREE" and the ID of client process that the server process is assigned to (ASSIGNED TO). For example, entry 320 specifies that server process S6 in NODE1 process pool 306 is currently in use and is assigned to perform work on NODE2 on behalf of client process C2. Entry 322 specifies that server process S9 in NODE1 process pool 306 is free and may be assigned to any client process, i.e. C1–C3. Note that server process S9 in NODE1 process pool 306 can only be assigned to one of client processes C1–C3.

Figure 5A:
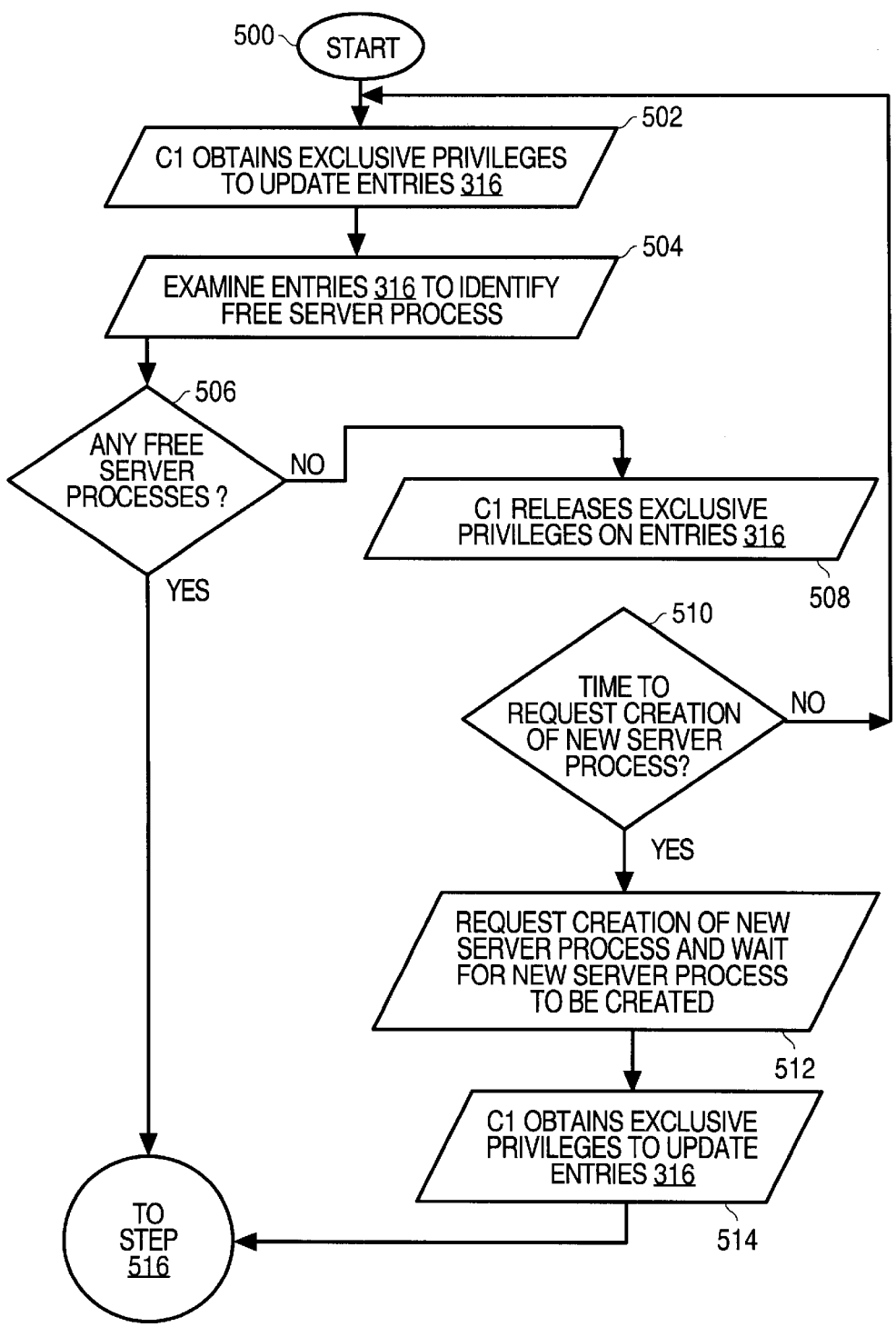
FIGS. 5A and 5B comprise a flow chart illustrating a method for using a remote server process to perform work for a client process according to an embodiment of the invention.
Figure 5B:
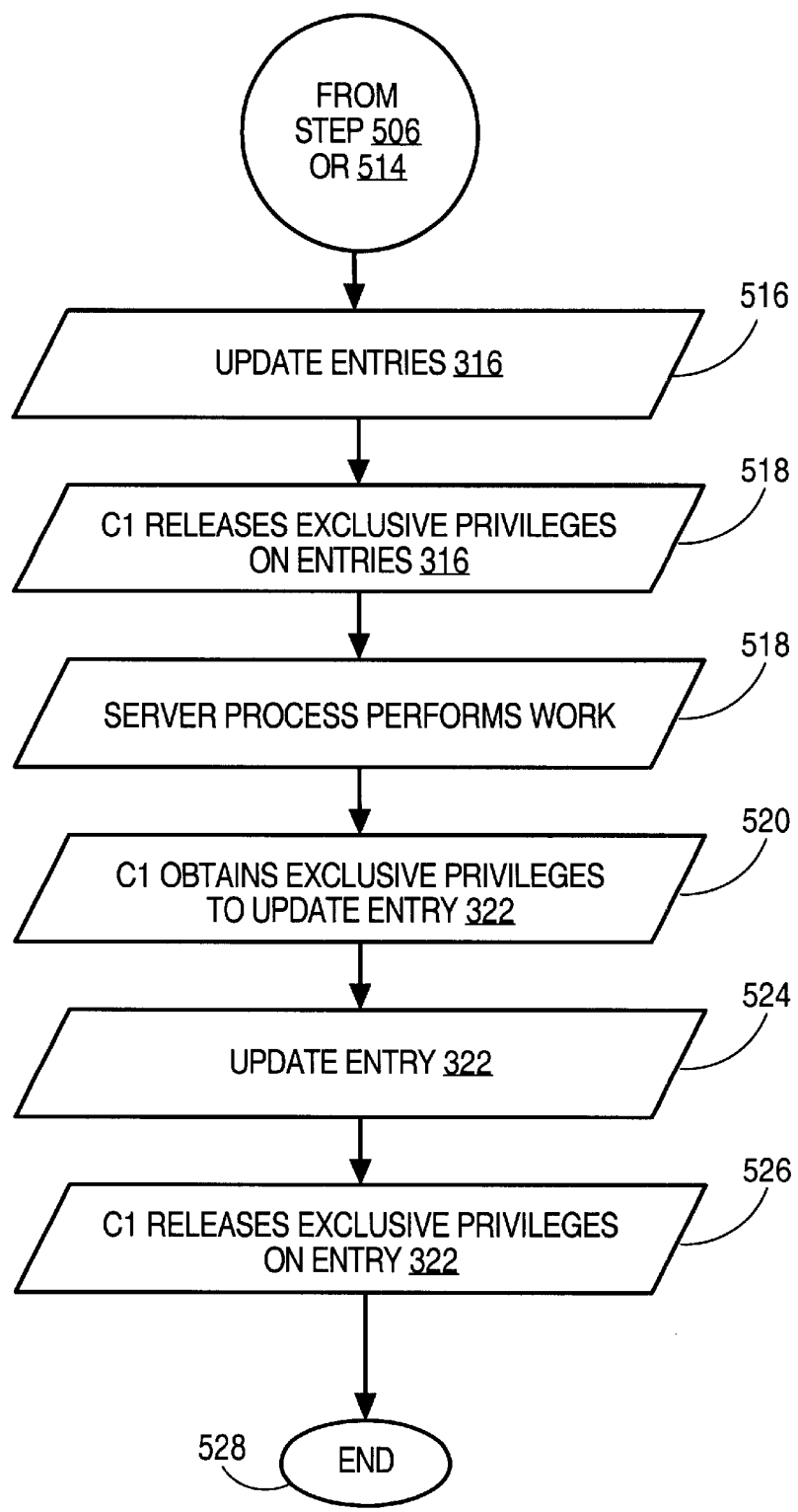

FIGS. 5A and 5B are a flow chart illustrating a method for using a remote server process to perform work for a client process according to an embodiment of the invention. The method is described in the context of client process C1 requiring work to be performed on NODE2. After starting in step 500, in step 502, client process C1 obtains exclusive privileges to update entries 316, for example by obtaining a lock on entries 316, which correspond to server processes S6–S9 in NODE1 process pool 306. This prevents other client processes, in this example C2 and C3, from updating entries 316 at the same time.

In step 504, entries 316 are examined to identify any server processes that have a status of FREE. In step 506, a determination is made whether any server processes are available. Client process C1 may examine entries itself or alternatively, a background process may be used to examine entries 316 to identify when a server process becomes available.

If no server processes are available, then in step 508, client process C1 releases exclusive privileges on entries 316. In step 510 a determination is made whether a new server process should be created. This determination may be made in several ways. For example, a counter may be used to track the number of times that steps 502 through 510 are performed and compared against a predetermined threshold. Alternatively, a timer may be used to determine when a predetermined amount of time has elapsed. If in step 510 a determination is made that it is not yet time to request a new server process, then steps 502 through 510 are repeated until either a server process becomes available in step 506 or a determination is made in step 510 that a new server process is to be created. Note that between the time that client process C1 releases exclusive privileges on entries 316 in step 508 and obtains the exclusive privileges again in step 502, one of the server processes (S6–S9) in NODE1 process pool 306 may become available.

If in step 510, a determination is made that a new server process is to be created, then in step 512 client process C1 requests that NODE2 create a new server process for NODE1 process pool 306 and then waits to receive confirmation that a new server process has been created. Then in step 514, client process 514 obtains exclusive privileges to update entries 316.

Once client process C1 obtains exclusive privileges to update entries 316 in step 514 or a determination is made in step 506 that a server process in NODE1 process pool 306 is available, then in step 516, entries 316 are updated to assign the available server process from NODE1 process pool 306 to client process C1. For example, if server process S9 becomes available, then the STATUS of entry 322 is changed from "FREE" to "IN USE" and the value of ASSIGNED TO is changed from "NA" to "C1".

In step 518, client process C1 releases its exclusive privileges on entries 316, typically by releasing a lock on entries 316. In step 520, the server process assigned to client process C1 performs the specified work for client process C1.

After the specified work has been completed, in step 522, client process C1 obtains exclusive privileges to update entry 322. In step 524, client process C1 updates entries 316 to reflect that the assigned server process has completed its assigned work and is available to perform work on behalf of other client processes. For example, the STATUS of entry 322 is changed from "IN USE" to "FREE" and the value of ASSIGNED TO is changed from "C1" to "NA". In some situations it may not be necessary for client process C1 to obtain exclusive privileges to update entries 316. For example the assignment of server process S9 to client process C1 may restrict the updating of the contents of entry 322 to client process C1.

In step 526, client process C1 releases its exclusive privileges on entry 322 so that server process S9 may be assigned to other client processes. Finally, the process is complete in step 528.

As illustrated by the forgoing example, the assignment of server processes from NODE1 process pool on NODE2 to client processes C1–C3 is managed locally by client processes C1–C3 using NODE1 local synchronization data 314. This avoids the use of a process pool manager on NODE2 and global synchronization which, in at least some circumstances, can reduce the amount of system resources and time required to manage a remote resource pool.

Referring to FIG. 3, NODE2 local synchronization data 324 is provided on NODE2 to synchronize server processes (S1 and S2) in NODE2 process pool 302 and server processes (S13–S15) in NODE2 process pool 312. In addition, NODE3 local synchronization data 326 is provided on NODE3 to synchronize server processes (S3–S5) in NODE3 process pool 304 and server process S10 in NODE3 process pool 308.

In some situations, more than one server process from a dedicated server process pool may be assigned to perform work on behalf of one client process. For example, entries 318 specify that both server processes S11 and S12 on NODE1 process pool 310 (NODE3) are assigned to perform work on behalf of client process C2.

As illustrated in FIG. 3, the various process pools 302, 304, 306, 308, 310 and 312 contain a different number of processes. According to one embodiment of the invention, the number of processes in a particular process pool may vary depending upon the amount of processing resources required. In situations where the required process resources exceeds the amount of available processing resources, processes may be added to a process pool.

For example, if server process S10 in NODE3 process pool 308 is insufficient to meet the processing requirements of client processes C7–C9, then additional processes may be added to NODE3 process pool 308. However, active processes consume system resources, even if the processes are not actively processing data. Therefore, in situations where the amount of processing resources consumed by server processes in a process pool exceeds the amount of required processing resources, the number of processes in the process pool may be decreased by terminating one or more server processes. For example, if server process S9 in NODE1 process pool 306 remains FREE for a predetermined amount of time, then according to one embodiment of the invention, server process S9 is terminated.

Process or Node Failure

In some situations a client or server process terminates prematurely (dies). These failures can be problematic because, for example, if a server process dies, the client process for whom the server process was working may not be aware of the failure. In extreme situations, an entire node can die. These types of failures can be generally categorized as follows: (1) a server process dies; (2) a client process dies; and (3) a node dies. Each of these events is handled using information obtained by one or more background tasks (not illustrated) executing on each of the nodes. The background tasks monitor the state of client and server processes executing on their associated node and are aware when a particular client or server process is no longer responding. The background tasks also are aware of the state of other nodes so that they will know if an entire node failure occurs.

Referring to FIG. 3, suppose server process S6 in NODE1 process pool 306 dies. According to one embodiment of the invention, a background task (not illustrated) executing on NODE2 learns that server process S6 has died and sends a message to client processes C1–C3 informing them that server process S6 has died. Client processes C1–C3 then clear out entry 320 corresponding to server process S6. An available server process from NODE1 process pool 306, such as server process S9, can then be assigned to client process C2. If there are no available server processes in NODE1 process pool 306, then client processes C1–C3 can request that an additional server process be spawned for NODE1 process pool 306.

In the event that a client process dies, a background task executing on the node where the failed client process died will be aware that the client process died. In this situation, the background task on the node where the failed client process died notifies the background task on the node where the server process for the failed client process is executing. The background task on the node where the server process is executing causes the server process to stop doing work for the failed client process. In addition, the background task on the node where the failed client process died directly updates the corresponding local synchronization data to free-up the server processes that were assigned to the process that died.

For example, suppose client process C2 dies. A background task executing on NODE1 notices that client process C2 died and informs the background task executing on NODE2 that client process C2 has died and that server process S6 should stop doing work on behalf of client process C2. The background task executing on NODE1 also directly updates entry 320 with a STATUS of "FREE" and an ASSIGNED TO value of "NA". In situations where client processes C1 and C3 do not have privileges to update entry 320, an override sequence may be invoked by the background task to update entry 320.

Although embodiments of the invention have been illustrated and described in the context of a distributed computing system where the nodes have an equal number, namely three, of client processes executing thereon, embodiments of the invention are applicable to distributed computing systems where the nodes do not have the same number of client processes executing thereon.

Hardware Overview

Figure 6:
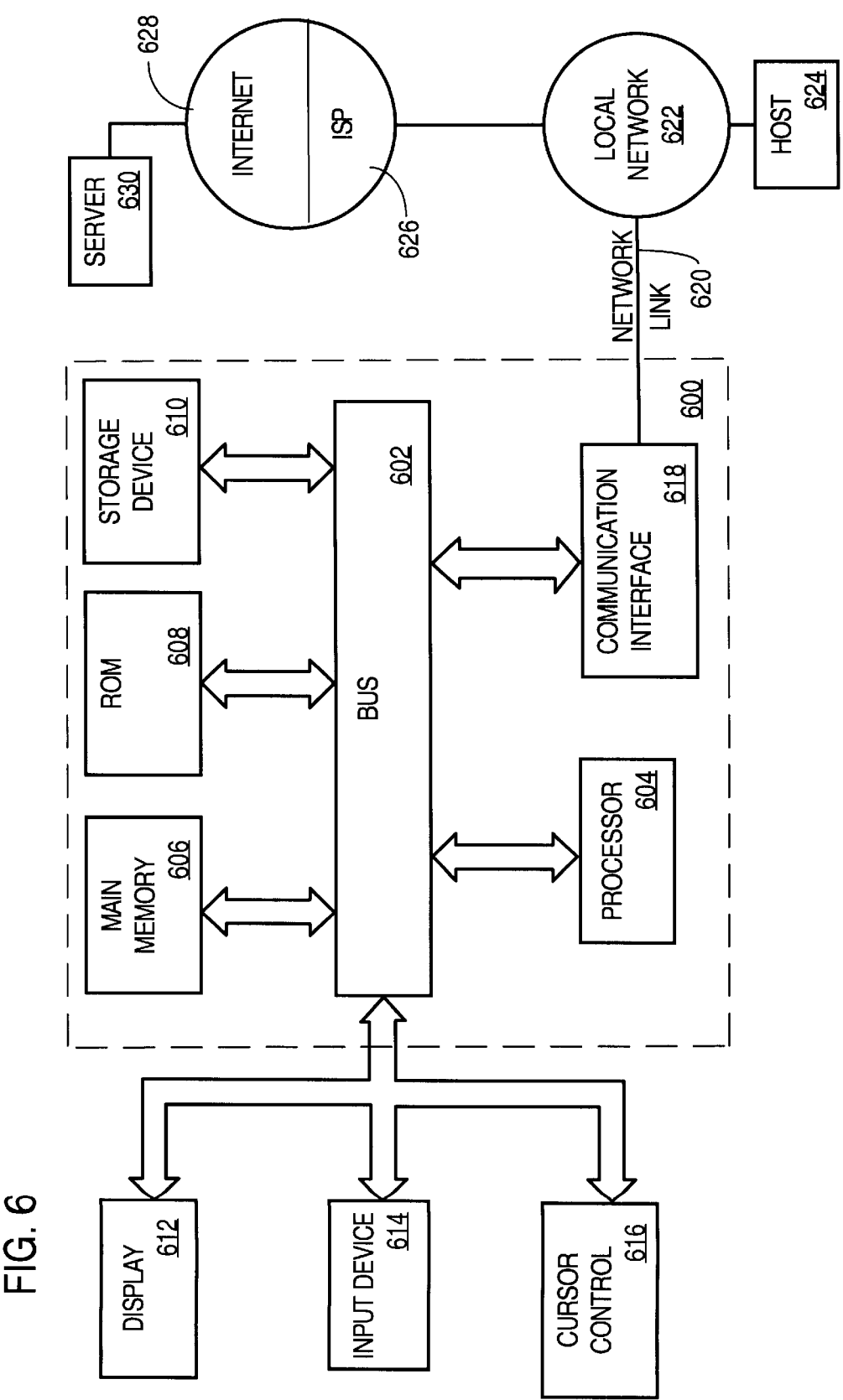
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing resources in a distributed computing environment. According to one embodiment of the invention, the management of resources in a distributed computing environment is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the management of resources in a distributed computing environment as described herein.

The received code may be executed by processor 604 as it is received, and/or stored in storage device 610, or other non-volatile storage for later execution. In this manner, computer system 600 may obtain application code in the form of a carrier wave.

The techniques described herein provide several advantages over prior approaches for managing resources in a distributed computing environment. First, the use of dedicated process pools allows the number of currently executing server processes to be dynamically adjusted to meet the current processing requirements, reducing the number of idle server processes and thereby reducing the amount of system resources that are required to maintain the server processes. In addition, the dedicated process pools are locally managed by the client processes on the node who use the dedicated process pools. This eliminates the need for local process pool managers and global synchronization, either of requires relatively more system resources and time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing data on a distributed system that includes a first node, a second node and a third node, the method comprising the steps of:

establishing, on the third node, a first dedicated process pool containing one or more server processes;

using the one or more server processes contained in the first dedicated process pool to perform work for only client processes executing on the first node;

establishing, on the third node, a second dedicated process pool containing one or more server processes;

using the one or more server processes contained in the second dedicated process pool to perform work for only client processes executing on the second node;

in response to requests to perform work from client processes on the first node, assigning one or more server processes from the first dedicated process pool to perform the work; and in response to requests to perform work from client processes on the second node, assigning one or more server processes from the second dedicated process pool to perform the work.

2. The method of claim 1, wherein the step of assigning one or more server processes from the first dedicated process pool to perform the work includes the steps of:

assigning a first set of one or more server processes from the first dedicated process pool to perform work for a first request from the client processes on the first node; and assigning a second set of one or more server processes from the first dedicated process pool to perform work for a second request from the client processes on the first node.

3. The method of claim 1, further including the steps of determining whether the first dedicated process pool contains enough server processes to perform work requested by the client processes on the first node, and if the first dedicated process pool does not contain enough server processes to perform the work requested by the client processes on the first node, then increasing the number of server processes in the first dedicated process pool.

4. The method of claim 3, further including the steps of establishing first synchronization data on the first node, the first synchronization data identifying the one or more server processes in the first dedicated process pool and the status of the one or more server processes in the first dedicated process pool, and examining one or more entries in first synchronization data.

5. The method of claim 1, further including the steps of establishing first synchronization data on the first node, the first synchronization data identifying each server process in the first dedicated process pool and a status of each server process in the first dedicated process pool, and updating the first synchronization data to indicate which processes in the first dedicated process pool have been assigned to perform a particular piece of work.

6. The method of claim 5, further including the step of after the particular piece of work has been performed, updating the first synchronization data to indicate that the one or more server processes that performed the piece of work are available to be assigned to perform other work for client processes on the first node.

7. The method of claim 5, further including the step of if the one or more server processes assigned to perform the work for the client processes on the first node prematurely terminate before the work has been performed, performing the steps of:

updating the first synchronization data to reflect that the one or more server processes assigned to perform the work for the client processes on the first node have prematurely terminated and are not longer available, assigning another one or more server processes from the first dedicated process pool to complete the work for the client processes on the first node, and updating the first synchronization data to reflect that the other one or more server processes from the first dedicated process pool have been assigned to perform the work for the client processes on the first node.

8. The method of claim 5, further including the step of after detecting that a particular server process in the first dedicated process pool has been idle for a predetermined amount of time, performing the steps of:

terminating the particular server process, and updating the first synchronization data to reflect that the particular server process has been terminated and is no longer available.

9. The method of claim 5, further including the step of after detecting that the client processes on the first node for whom the work is being performed have prematurely terminated, performing the steps of:

stopping the one or more server processes assigned to perform the work for the client processes on the first node from performing the first work, and updating the first synchronization data to reflect that the one or more server processes assigned to perform the work for the client processes on the first node are no longer performing the work and are available to perform work only for other client processes on the first node.

10. The method of claim 1, further including the steps of establishing first synchronization data on the first node, the first synchronization data identifying the one or more server processes in the first dedicated process pool and their status, and establishing second synchronization data on the second node, the second synchronization data identifying the one or more server processes in the second dedicated process pool and their status.

11. The method of claim 1, further including the steps of
establishing, on the first node, a third dedicated process pool containing one or more server processes,
using the one or more server processes in the third dedicated process pool to perform work for only client processes executing on the third node, and
in response to requests to perform work from client processes on the third node, assigning one or more server processes from the third dedicated process pool to perform the work.

12. The method of claim 11, further including the step of establishing third synchronization data on the third node, the third synchronization data identifying the one or more server processes in the third dedicated process pool and their status.

13. A method for processing data on a distributed system that includes a first node, a second node and a third node, the method comprising the steps of:
establishing, on the first node, first synchronization data associated with client processes on the first node at identifies one or more server processes contained in a first dedicated process pool on a second node that are established to perform work only for the client processes on the first node, the first synchronization data also specifying which of the one or more server processes contained in the first dedicated process pool are currently performing work for the client processes on the first node and which of the client processes on the first node the one or more server processes contained in the fist dedicated process pool are performing work for; and
establishing, on the second node, second synchronization data associated with client processes on the second node that identifies one or more server processes contained in a second dedicated process pool on a the second node that are established to perform work only for the client processes on the second node, the second synchronization data also specifying which of the one or more server processes contained in the second dedicated process pool are currently performing work for the client processes on the second node and which of the client processes on the second node the one or more server processes contained in the second dedicated process pool are performing work for.

14. The method of claim 13, further including the step of in response to the client processes on the first node requesting that work be performed by the one or more server processes contained in the first dedicated process pool, performing the steps of
assigning one or more server processes from the first dedicated process pool to perform the work requested by the client processes on the first node, and
updating the first synchronization data to reflect that the one or more server processes from the first dedicated process pool have been assigned to perform the work requested by the client processes on the first node.

15. The method of claim 14, further including the step of in response to the client processes on the second node requesting that work be performed by the one or more server processes contained in the second dedicated process pool, performing the steps of
assigning one or more server processes from the second dedicated process pool to perform the work requested by the client processes on the second node, and
updating the second synchronization data to reflect that the one or more server processes from the second dedicated process pool have been assigned to perform the work requested by the client processes on the second node.

16. A distributed computing system for processing data, the distributed computing system comprising:
a first node with a first plurality of client processes executing thereon;
a second node with a second plurality of client processes executing thereon; and
a third node including:
a first dedicated process pool containing one or more server processes configured to perform work for only the first plurality of client processes, and
a second dedicated process pool containing one or more server processes configured to perform work for only the second plurality of client processes.

17. A computer system as recited in claim 16, further comprising
first synchronization data maintained on the first node for maintaining an identity and status of the one or more server processes contained in the first dedicated process pool, and
second synchronization data maintained on the second node for maintaining an identity and status of the one or more server processes contained in the second dedicated process pool.

18. A computer-readable medium carrying one or more sequences of one or more instructions for method processing data on a distributed system that includes a first node, a second node and a third node, the one or more sequences of one or more instructions including instructions which, when executed by one or more processors, cause the one or more processors to perform the steps of:
establishing, on the third node, a first dedicated process pool containing one or more server processes;
using the one or more server processes contained in the first dedicated process pool to perform work for only client processes executing on the first node;
establishing, on the third node, a second dedicated process pool containing one or more server processes;
using the one or more server processes contained in the second dedicated process pool to perform work for only client processes executing on the second node;
in response to requests to perform work from client processes on the first node, assigning one or more server processes from the first dedicated process pool to perform the work; and
in response to requests to perform work from client processes on the second node, assigning one or more server processes from the second dedicated process pool to perform the work.

19. The computer-readable medium of claim 18, wherein the step of assigning one or more server processes from the first dedicated process pool to perform the work includes the steps of:
assigning a first set of one or more server processes from the first dedicated process pool to perform work for a first request from the client processes on the first node; and
assigning a second set of one or more server processes from the first dedicated process pool to perform work for a second request from the client processes on the first node.

20. The computer-readable medium of claim 18, further including instructions for performing the steps of
determining whether the first dedicated process pool contains enough server processes to perform work requested by the client processes on the first node, and if the first dedicated process pool does not contain enough server processes to perform the work requested by the client processes on the first node, then increasing the number of server processes in the first dedicated process pool.

21. The computer-readable medium of claim 20, further including instructions for performing the steps of
establishing first synchronization data on the first node, the first synchronization data identifying the one or more server processes in the first dedicated process pool and the status of the one or more server processes in the first dedicated process pool, and
examining one or more entries in first synchronization data.

22. The computer-readable medium of claim 18, further including instructions for performing the steps of
establishing first synchronization data on the first node, the first synchronization data identifying each server process in the first dedicated process pool and a status of each server process in the first dedicated process pool, and
updating the first synchronization data to indicate which processes in the first dedicated process pool have been assigned to perform a particular piece of work.

23. The computer-readable medium of claim 22, further including instructions for performing the step of after the particular piece of work has been performed, updating the first synchronization data to indicate that the one or more server processes that performed the piece of work are available to be assigned to perform other work for client processes on the first node.

24. The computer-readable medium of claim 22, further including instructions for performing the step of if the one or more server processes assigned to perform the work for the client processes on the first node prematurely terminate before the work has been performed, performing the steps of:
updating the first synchronization data to reflect that the one or more server processes assigned to perform the work for the client processes on the first node have prematurely terminated and are not longer available,
assigning another one or more server processes from the first dedicated process pool to complete the work for the client processes on the first node, and
updating the first synchronization data to reflect that the other one or more server processes from the first dedicated process pool have been assigned to perform the work for the client processes on the first node.

25. The computer-readable medium of claim 22, further including instructions for performing the step of after detecting that a particular server process in the first dedicated process pool has been idle for a predetermined amount of time, performing the steps of:
terminating the particular server process, and
updating the first synchronization data to reflect that the particular server process has been terminated and is no longer available.

26. The computer-readable medium of claim 22, further including instructions for performing the step of after detecting that the client processes on the first node for whom the work is being performed have prematurely terminated, performing the steps of:
stopping the one or more server processes assigned to perform the work for the client processes on the first node from performing the first work, and
updating the first synchronization data to reflect that the one or more server processes assigned to perform the work for the client processes on the first node are no longer performing the work and are available to perform work only for other client processes on the first node.

27. The computer-readable medium of claim 18, further including instructions for performing the steps of
establishing first synchronization data on the first node, the first synchronization data identifying the one or more server processes in the first dedicated process pool and their status, and
establishing second synchronization data on the second node, the second synchronization data identifying the one or more server processes in the second dedicated process pool and their status.

28. The computer-readable medium of claim 18, further including instructions for performing the steps of
establishing, on the first node, a third dedicated process pool containing one or more server processes,
using the one or more server processes in the third dedicated process pool to perform work for only client processes executing on the third node, and
in response to requests to perform work from client processes on the third node, assigning one or more server processes from the third dedicated process pool to perform the work.

29. The computer-readable medium of claim 28, further including instructions for performing the step of establishing third synchronization data on the third node, the third synchronization data identifying the one or more server processes in the third dedicated process pool and their status.

30. A computer-readable medium carrying a one or more sequences of one or more instructions for processing data on a distributed system that includes a first node, a second node and a third node, the one or more sequences of one or more instructions including instructions which, when executed by one or more processors, cause the one or more processors to the steps of:
establishing, on the first node, first synchronization data associated with client processes on the first node that identifies one or more server processes contained in a first dedicated process pool on a second node that are established to perform work only for the client processes on the first node, the first synchronization data also specifying which of the one or more server processes contained in the first dedicated process pool are currently performing work for the client processes on the first node and which of the client processes on the first node the one or more server processes contained in the first dedicated process pool are performing work for; and
establishing, on the second node, second synchronization data associated with client processes on the second node that identifies one or more server processes contained in a second dedicated process pool on the second node that are established to perform work only for the client processes on the second node, the second synchronization data also specifying which of the one or more server processes contained in the second dedicated process pool are currently performing work for the client processes on the second node and which of the client processes on the second node the one or more server processes contained in the second dedicated process pool are performing work for.

31. The computer-readable medium of claim 30, further comprising one or more additional instructions which, when executed by the one or more processors, cause the one or more processors to perform the step of in response to the client processes on the first node requesting that work be performed by the one or more server processes contained in the first dedicated process pool, performing the steps of assigning one or more server processes from the first dedicated process pool to perform the work requested by the client processes on the first node, and updating the first synchronization data to reflect that the one or more server processes from the first dedicated process pool have been assigned to perform the work requested by the client processes on the first node.

32. The computer-readable medium of claim 31, further comprising one or more additional instructions which, when executed by the one or more processes, cause the one or more processors to perform the step of in response to the client processes on the second node requesting that work be performed by the one or more server processes contained in the second dedicated process pool, performing the steps of assigning one or more server processes from the second dedicated process pool to perform the work requested by the client processes on the second node, and updating the second synchronization data to reflect that the one or more server processes from the second dedicated process pool have been assigned to perform the work requested by the client processes on the second node.

* * * * *

UNITED STATES PATENT AND TRADEMARK OFFICE
CERTIFICATE OF CORRECTION

PATENT NO. : 6,314,114 B1
DATED : November 6, 2001
INVENTOR(S) : Coyle et al.

It is certified that error appears in the above-identified patent and that said Letters Patent is hereby corrected as shown below:

Title page,
Replace "Inventors: Mark Coyle, Mountain View" with -- Inventors: Mark Coyle, San Francisco, --

Signed and Sealed this

Twenty-first Day of May, 2002

*Attest:*

*Attesting Officer*

JAMES E. ROGAN
*Director of the United States Patent and Trademark Office*